United States Patent [19]
Hansen et al.

[11] Patent Number: 5,896,549
[45] Date of Patent: Apr. 20, 1999

[54] SYSTEM FOR SELECTING BETWEEN INTERNAL AND EXTERNAL DMA REQUEST WHERE ASP GENERATES INTERNAL REQUEST IS DETERMINED BY AT LEAST ONE BIT POSITION WITHIN CONFIGURATION REGISTER

[75] Inventors: John P. Hansen, Austin; Melanie D. Typaldos, Buda; Louis R. Stott, Austin, all of Tex.

[73] Assignee: Advanced Micro Devices, Inc.

[21] Appl. No.: 08/807,103

[22] Filed: Feb. 4, 1997

[51] Int. Cl.$^6$ .................................................. G06F 3/00
[52] U.S. Cl. ................................................................ 395/842
[58] Field of Search ........................ 395/842; 364/242.3, 364/242.31, 260

[56] References Cited

U.S. PATENT DOCUMENTS

| | | | |
|---|---|---|---|
| 4,782,439 | 11/1988 | Borkar et al. | 364/200 |
| 5,099,417 | 3/1992 | Magar et al. | 395/425 |
| 5,499,384 | 3/1996 | Lentz et al. | 395/821 |
| 5,668,815 | 9/1997 | Gittinger et al. | 371/21.2 |

*Primary Examiner*—Thomas C. Lee
*Assistant Examiner*—Anderson I. Chen
*Attorney, Agent, or Firm*—Kevin L. Daffer; Conley, Rose & Tayon

[57] ABSTRACT

A microcontroller is presented which is configurable to transfer data to and from one or more asynchronous serial ports (ASPs) using direct memory access (DMA). The microcontroller includes an execution unit, a DMA unit, one or more ASPs, and at least one input/output (I/O) pad formed upon a single monolithic semiconductor substrate. The execution unit is configured to execute instructions, preferably x86 instructions. Each ASP is configurable to generate an internal DMA request signal, which effectuates a DMA transfer of serial communication data, and multiple DMA control signals. Each I/O pad is adapted to receive an external DMA request signal generated by a device external to the microcontroller. The DMA unit includes selection logic coupled to one or more DMA channel circuits. The selection logic receives the internal and external DMA request signals as well as the DMA control signals, and produces a DMA request signal for each DMA channel circuit. Each DMA request signal is either an internal DMA request signal or an external DMA request signal, depending upon the DMA control signals. Each DMA channel circuit receives the corresponding DMA request signal and performs a data transfer operation in response to the DMA request signal. During the DMA transfer operation, data is read from a first address and written to a second address. Each ASP and DMA channel circuit includes at least one configuration register, the contents of which determine the operation of the ASP or DMA channel circuit.

21 Claims, 5 Drawing Sheets

SYSTEM FOR SELECTING BETWEEN INTERNAL AND EXTERNAL DMA REQUEST WHERE ASP GENERATES INTERNAL REQUEST IS DETERMINED BY AT LEAST ONE BIT POSITION WITHIN CONFIGURATION REGISTER

BACKGROUND OF THE INVENTION

1. Field of the Invention

This invention relates to the manufacture of microcontrollers and more particularly to the manufacture of microcontrollers which can exchange data with external devices.

2. Description of the Relevant Art

A microcontroller is an integrated circuit which incorporates a microprocessor core along with one or more support circuits on the same monolithic semiconductor substrate (i.e., chip). A typical computer system includes a microprocessor secured within its own semiconductor device package and connected to several separately-packaged support circuits. The support circuits perform support functions such as communication functions and memory interface functions. Computer systems which employ microcontrollers may thus be formed using fewer semiconductor devices. Advantages of such systems include lower fabrication costs and higher reliabilities. Microcontrollers find applications in industrial and commercial products including control systems, computer terminals, hand-held communications devices (e.g., cellular telephones), photocopier machines, facsimile machines, and hard disk drives.

Asynchronous serial communication is the standard means of transmitting data over distances greater than about 25 feet. In serial data communication, each unit of data (e.g., an 8-bit byte representing a character) is transmitted one bit at a time over a transmission medium (e.g., a pair of wires, a coaxial cable, etc.). In asynchronous serial communication, a "start" bit (always a 0) is typically transmitted before the first character bit, and one or more "stop" bits (always a 1) are transmitted after the last character bit. These extra bits are used to "frame" the data in order to signal the beginning and end of a character bit transmission, thus synchronizing a transmitter and a receiver. The transmitter and receiver must both use the same set of rules designating how many bits are transmitted per second (i.e., the baud rate), how many bits represent a character, whether a parity bit is transmitted after the last character bit, and how many stop bits are added after character transmission.

Due to the prevalence of serial data communication, many microcontrollers include one or more asynchronous serial ports (ASPs) which can transmit and/or receive data one bit at a time. Such microcontrollers typically employ interrupt signals to notify the microprocessor core that an ASP requires service. An ASP typically issues an interrupt request signal when a character has been received by the ASP and needs to be transferred from the ASP to an external memory unit, or when the ASP has finished transmitting a character and the next character to be transmitted must be transferred from the external memory unit to the ASP.

The microprocessor core executes instructions of software programs. Upon receiving an interrupt request signal from the ASP, the microprocessor core stops program execution, saves the contents of certain critical registers (i.e., saves its internal state), and begins executing instructions of an appropriate interrupt service routine (i.e., an interrupt handler) associated with the ASP. When execution of the interrupt service routine is completed, the microprocessor core restores the saved contents of the critical registers (i.e., restores the internal state) and resumes execution of the interrupted program at the point where the interruption occurred.

When interrupts are used to service an ASP, the microprocessor core must first save its internal state and execute a portion of the instructions of the interrupt service routine. The amount of time required to perform these actions places an upper bound on the number of bits the ASP may transmit or receive each second (i.e., the maximum operational baud rate of the ASP). In addition, the microprocessor core must interrupt program execution in order to service the ASP, negatively impacting the performance of the microprocessor core.

Direct memory access (DMA) is a well known technique which allows data transfers without involving the microprocessor core. In addition, many microcontrollers include a DMA unit which controls DMA data transfer operations. The microprocessor core simply initializes control registers within the DMA unit with transfer control information. The transfer control information typically includes the first address of the source of the block of data to be transferred (i.e., the source address), the first address of the destination of the block of data to be transferred (i.e., the destination address), and the number of bytes or words to be transferred (i.e., the byte/word count).

When a device needs to transfer data, the device generates a DMA request signal. The DMA unit responds to the DMA request signal by gaining control of the common bus interconnecting the involved devices and initiating the data transfer operation. The DMA unit generates address and control signals needed to read a byte or word of data from the source address and to write the data to the destination address. After each read/write operation, the source and destination addresses and the byte/word count are either incremented or decrement. This process is continued until the data transfer operation is complete. When the data transfer operation is complete, the DMA unit relinquishes control of the common bus.

It would thus be desirable to have a microcontroller which is configurable to transfer data to and from one or more ASPs using DMA. The maximum baud rate of each ASP within the microcontroller would be increased, and the performance of the microprocessor core of the microcontroller would be improved during ASP operation. It would also be advantageous to route a DMA request signal from an ASP to the DMA unit internal to the microcontroller.

SUMMARY OF THE INVENTION

The problems outlined above are in large part solved by a microcontroller which is configurable to transfer data to and from one or more asynchronous serial ports (ASPs) using direct memory access (DMA). The microcontroller includes an execution unit (i.e., microprocessor core), a DMA unit, one or more ASPs, and at least one input/output (I/O) pad formed upon a single monolithic semiconductor substrate. The execution unit is configured to execute instructions, preferably x86 instructions. Each ASP is adapted to transmit serial communication data to an external device and/or receive serial communication data from an external device, and is configurable to generate an internal DMA request signal to effectuate a DMA transfer of serial communication data. Each pad is adapted to receive an external DMA request signal generated by a device external to the microcontroller. The DMA unit includes selection logic coupled to one or more DMA channel circuits. The selection logic is coupled to receive the internal and external DMA request signals, and is configured to produce a DMA request signal for each DMA channel circuit. Each DMA request signal produced by the selection logic is either an internal DMA request signal or an external DMA request signal. Each DMA channel circuit is coupled to receive the corresponding DMA request signal, and is configurable to perform a data transfer operation in response to the DMA request signal. During the DMA transfer operation, the DMA channel circuit reads data from a first address space and writes the data to a second address space.

In order to accomplish DMA transfer of serial communication data, the internal DMA request signals generated by the ASPs must be routed to the DMA unit. Including selection logic within the DMA unit to accomplish this routing has benefits over accomplishing this routing external to the microcontroller. Routing of signals generated by the ASPs is through an internally generated DMA request. If ASP routing is carried out through externally generated DMA request instead of the present internally generated DMA request, then external pins must be added to the microcontroller. Those pins must carry the ASP DMA request signals to the existing DMA request signal input pins of the DMA unit. These benefits include eliminating the need for new package pins and the resulting hardware compatibility with existing products. In addition, the microcontroller may be reconfigured via software to select between the ASP DMA request signals and DMA request signals generated by devices external to the microcontroller without having to change the wiring of a printed circuit board to which the microcontroller is physically connected.

Each ASP includes at least one configuration register, the contents of which determine the operation of the ASP. Generation of the internal DMA request signal by an ASP is determined by the contents of at least one bit position within a corresponding ASP configuration register. In a receive mode, each ASP extracts a unit of serial communication data from a serial bit stream prior to generating the internal DMA request signal. In a transmit mode, each ASP transmits a serial communication data unit as a serial bit stream prior to generating the internal DMA request signal.

Each ASP also produces a plurality of DMA control signals according to the contents of at least one bit position within a corresponding configuration register. The selection logic is coupled to receive the plurality of DMA control signals from each ASP, and uses the plurality of DMA control signals from each ASP to produce the DMA request signals.

In a preferred embodiment, each ASP is configurable to generate an ASP interrupt request signal when at least one predefined error condition occurs (e.g., a parity error, a framing error, or an overrun error), the DMA channel circuitry is configurable to generate a DMA interrupt request signal when the data transfer operation is complete, and the microcontroller also includes an interrupt control unit (ICU). Generation of the ASP interrupt request signal by an ASP is determined by the contents of at least one bit position within a corresponding ASP configuration register. Each DMA channel circuit includes at least one configuration register, the contents of which determine the operation of the DMA unit. Generation of the DMA interrupt request signal by a given DMA channel circuit is determined by the contents of at least one bit position within a corresponding DMA channel circuit configuration register. The ICU is coupled to receive the ASP and DMA interrupt request signals, and is configured to produce an interrupt request signal in response to the ASP and DMA interrupt request signals. The execution unit is coupled to receive the interrupt request signal and configured to execute a predefined set of instructions in response to the interrupt request signal. Each ASP is also preferably configurable to generate an ASP interrupt request signal upon the occurrence of certain internal conditions (e.g., parity error detected, framing error detected, overrun error detected, etc.) during a DMA data transfer operation.

BRIEF DESCRIPTION OF THE DRAWINGS

Other objects and advantages of the invention will become apparent upon reading the following detailed description and upon reference to the accompanying drawings in which.

Figure 1:
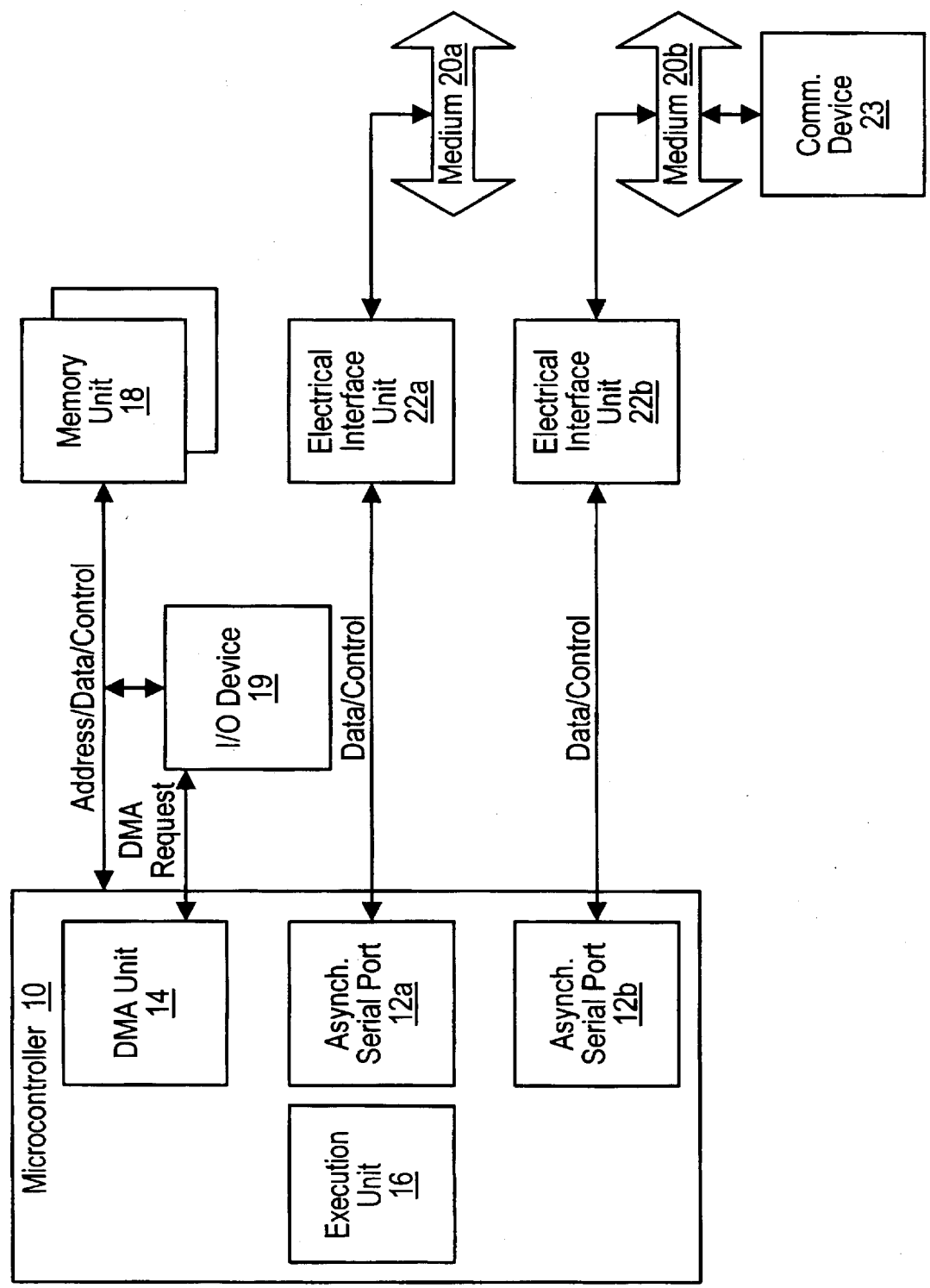
FIG. 1 is a block diagram of a communication system including a preferred embodiment of a microcontroller of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a block diagram of a communication system including a preferred embodiment of microcontroller 10 of the present invention. Microcontroller 10 includes two independent asynchronous serial ports (ASPs) 12a and 12b, a direct memory access (DMA) unit 14, and an execution unit 16. Microcontroller 10 is coupled to one or more memory units 18 and an external input/output (I/O) device 19 via address, data, and control signal lines. I/O device 19 may be, for example, a disk drive unit or a display device. Execution unit 16 executes instructions stored within the one or more memory units 18 during operation of microcontroller 10. ASP 12a is coupled to a serial communication data transmission medium 20a via an electrical interface unit 22a, and ASP 12b is coupled to a serial communication data transmission medium 20b via an electrical interface unit 22b. ASP 12a is configurable to transmit serial communication data upon transmission medium 20a and/or to receive serial communication from transmission medium 20a. Similarly, ASP 12b is configurable to transmit serial communication data upon transmission medium 20b and/or to receive serial communication from transmission medium 20b. A communication device 23 is also coupled to transmission medium 20b. Microcontroller 10 may communicate with communication device 23 via serial communication data transmitted upon and/or received from transmission medium 20b by ASP 12b. DMA unit 14 performs a DMA technique, transferring data between devices without involving execution unit 16. For example, I/O device 19 generates an external DMA request signal in order to initiate a DMA data transfer operation. DMA unit 14 receives the external DMA request signal and performs the DMA transfer operation in response to the external DMA request signal.

DMA unit 14 may also be used to transfer data between ASPs 12a–b and the one or more memory units 18. For example, ASP 12a may be configured to transmit serial communication data upon transmission medium 20a and to generate a first internal DMA request signal when a data unit has been transmitted and the next data unit to be transmitted is required (i.e., a transmit register is empty). ASP 12b may be configured to receive serial communication data from communication device 23 via transmission medium 20b and to generate a second internal DMA request signal when a data frame containing a data unit has been received (i.e., a receive register is full). A transmit data buffer may be defined within the one or more memory units 18 to store data to be transmitted by ASP 12a, and a receive data buffer may be defined within the one or more memory units 18 to store data received by ASP 12b. DMA unit 14 may be configured to transfer serial communication data from the transmit data buffer to ASP 12a in response to the first internal DMA request signal, and to transfer serial communication data received by ASP 12b to the receive data buffer in response to the second DMA request signal. The DMA data transfer operations are carried out without the involvement of execution unit 16, thus ASPs 12a–b operate without significantly impacting the operation of execution unit 16.

Figure 2:
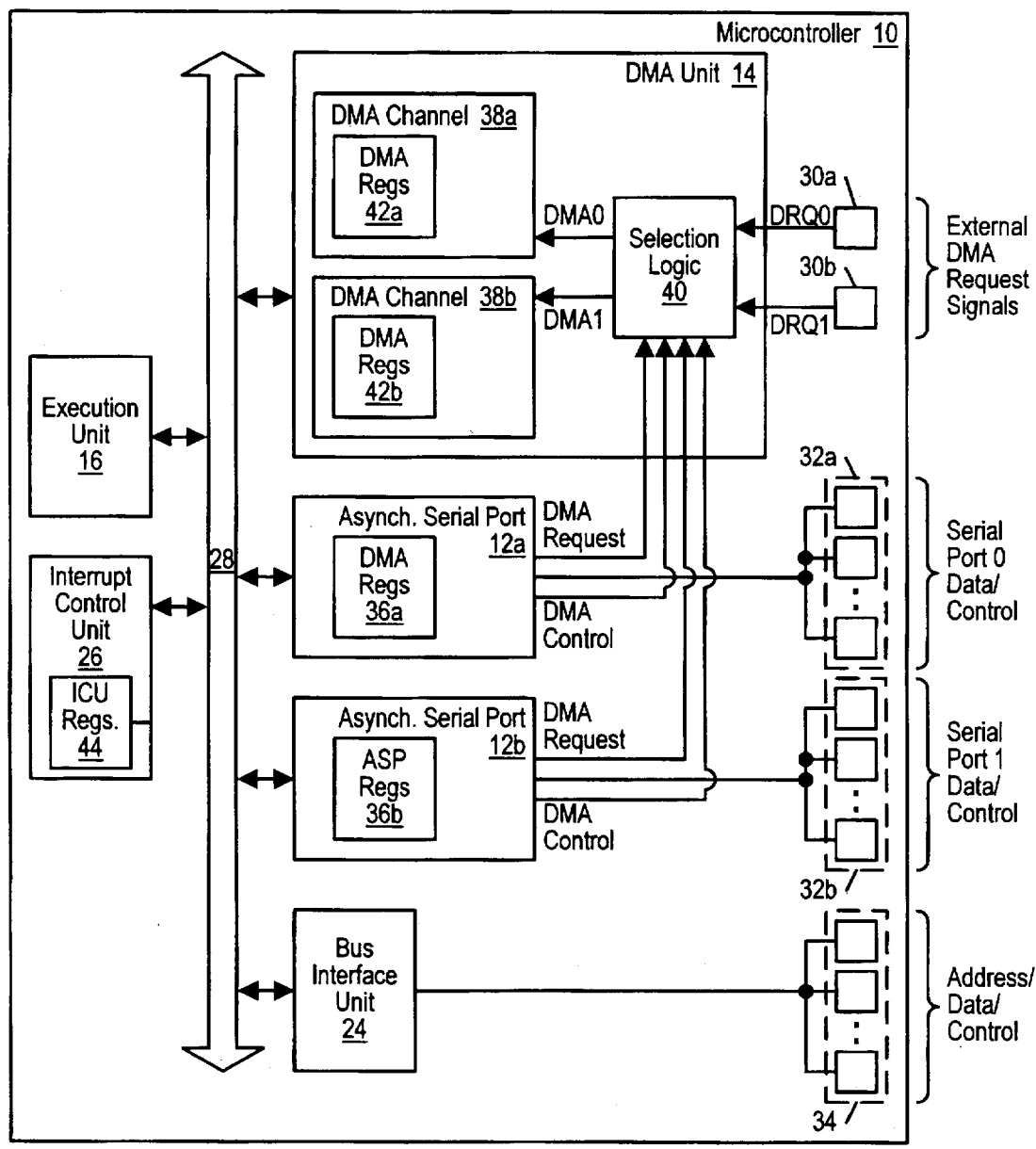
FIG. 2 is a block diagram of a preferred embodiment of the microcontroller of FIG. 1, wherein the microcontroller includes two asynchronous serial ports (ASPs), a DMA unit, and an interrupt control unit (ICU), all formed upon a single monolithic semiconductor substrate.

FIG. 2 is a block diagram of a preferred embodiment of microcontroller 10 of FIG. 1. Microcontroller 10 includes ASPs 12a–b, DMA unit 14, and execution unit 16 as well as a bus interface unit (BIU) 24, an interrupt control unit (ICU) 26, a core bus 28, a first input/output (I/O) pad 30a, a second I/O pad 30b, a first set of I/O pads 32a, a second set of I/O pads 32b, and a third set of I/O pads 34, all formed upon a single monolithic semiconductor substrate (i.e., chip).

During manufacture of microcontroller 10, signal lines to be connected to external signal lines are terminated at flat metal contact regions (i.e., I/O pads) located upon an exposed surface of the chip. Following manufacture, microcontroller 10 is typically secured within a protective semiconductor device package. Each I/O pad is then connected to a terminal (i.e., pin) of the device package by a signal line (i.e., a wire). Some I/O pads only convey output signals (e.g., address signals and output control signals). Other I/O pads carry only input signals (e.g., input control signals). Still other I/O pads convey both input and output signals (e.g., data signals). I/O pads carrying input signals typically have associated buffer circuits which drive voltage levels present upon the I/O pads onto corresponding internal signal lines of microcontroller 10. I/O pads carrying output signals typically have associated driver circuits which drive voltage levels present upon internal signal lines of microcontroller 10 onto the corresponding I/O pads.

Core bus 28 includes multiple signal lines for conveying signals. ASPs 12a–b, DMA unit 14, execution unit 16, BIU 24, and ICU 26 are coupled to core bus 28, and communicate via signal lines of core bus 28. Execution unit 16 executes microprocessor instructions, preferably from an instruction set of an x86 microprocessor. BIU 24 is coupled to the third set of I/O pads 34. Members of the third set of I/O pads 34 are intended to be connected to corresponding signal lines of external address, data, and control buses. BIU 24 handles all data transfers between microcontroller 10 and external devices (e.g., the one or more memory units 18 of FIG. 1, one or more I/O devices, etc.) coupled to the address, data, and control buses. BIU 24 contains multiple data buffers and is configured to implement established protocols in order to accomplish data transfers. BIU 24 generates address, data, and control signals, and drives the signals onto corresponding members of the third set of I/O pads 34 and onto the connected signal lines of the external address, data, and control buses.

ASP 12a is coupled to the first set of I/O pads 32a, and ASP 12b is coupled to the second set of I/O pads 32b. Members of the first and second sets of I/O pads 32a–b convey serial communication data and control signals, and are intended to be coupled to external signal lines. Each ASP 12 is typically coupled to a serial communication data transmission medium (e.g., a pair of wires, a coaxial cable, etc.) via an electrical interface unit as shown in FIG. 1. Each ASP 12 is configurable to transmit serial communication data upon the associated transmission medium and/or to receive serial communication data from the associated transmission medium. ASP 12a includes a first set of ASP registers 36a, and ASP 12b includes an identical second set of ASP registers 36b. Each set of ASP registers 36 includes multiple registers, the contents of which determine the operation of the corresponding ASP 12.

In the preferred embodiment of FIG. 2, DMA unit 14 includes two DMA channels 38a–b and selection logic 40. Once properly configured, each DMA channel 38 is capable of transferring data between two ranges of the address space of microcontroller 10 without the involvement of execution unit 16. The address space of microcontroller 10 is $2^n$, where n is the number of address signals simultaneously generated by BIU 24. For example, a microcontroller having 20 address pins may generate $2^{20}$ unique memory addresses and thus access $2^{20}$ unique memory locations (i.e., 1,048,576 memory locations or a 1 megabyte address space). DMA channel 38a includes a first set of DMA registers 42a, and DMA channel 38b includes an identical second set of DMA registers 42b. Each set of DMA registers 42 includes multiple registers, the contents of which determine the operation of the corresponding DMA channel 38. DMA registers 42 are programmed with a source address, a destination address, and a transfer count defining the number of data units (e.g., bytes) to be transferred.

For example, one or more memory units may be coupled to BIU 24 via external address, data, and control signal lines, ASP 12a may be configured to transmit serial communication data upon a first transmission medium, and ASP 12b may be configured to receive serial communication data from a second transmission medium. Two data buffers having different address ranges may be defined within the one or more memory units: a transmit data buffer to store data to be transmitted by ASP 12a and a receive data buffer to store data received by ASP 12b. DMA channel 38a may be configured to transfer data from the transmit data buffer address range to the range of addresses assigned to ASP 12a. DMA channel 38b may be configured to transfer data from the range of addresses assigned to ASP 12b to the receive data buffer address range. ASPs 12a–b thus perform serial data communication operations without significantly impacting the operation of execution unit 16.

Each ASP 12 is configurable to generate an internal DMA request signal and DMA control signals. I/O pads 30a and 30b are intended to convey external DMA request signals, DRQ0 and DRQ1, respectively, generated by external devices. Selection logic 40 of DMA unit 14 is coupled to receive the two internal DMA request signals, the DMA control signals, and the two external DMA request signals DRQ0 and DRQ1. Selection logic 40 is configured to produce two DMA request signals, DMA0 and DMA1. As will be described in more detail below, DMA0 is either the external DMA request signal DRQ0 or the internal DMA request signal produced by ASP 12a or ASP 12b dependent upon the DMA control signals. Similarly, DMA1 is either the external DMA request signal DRQ1 or the DMA request signal produced by ASP 12a or ASP 12b dependent upon the DMA control signals. DMA channel 38a is coupled to receive DMA0, and is configurable to perform a data transfer operation in response to the assertion of DMA0. DMA channel 38b is coupled to receive DMA1, and is configurable to perform a data transfer operation in response to the assertion of DMA1.

Each ASP 12 is configurable to generate an ASP interrupt request signal under certain conditions which require the execution of software service routines by execution unit 16, including error conditions occurring during serial data communication operations. Each DMA channel 38 is also configurable to generate a DMA interrupt request signal when a data transfer operation is complete. ICU 26 receives the ASP and DMA interrupt request signals via signal lines of core bus 28. Upon receiving ASP or DMA interrupt request signals, ICU 26 prioritizes the interrupt request signals and produces an interrupt request signal identifying the highest priority interrupt request. Execution unit 16 receives the interrupt request signal via a signal line of core bus 28. Upon receiving the interrupt request signal, execution unit 16 stops program execution, saves the contents of certain critical registers (i.e., saves its internal state), and begins executing instructions of the appropriate interrupt service routine (i.e., an interrupt handler). When execution of the interrupt service routine is completed, execution unit 16 restores the saved contents of the critical registers (i.e., restores the internal state) and resumes execution of the interrupted program at the point where the interruption occurred. ICU 26 includes multiple ICU registers 44, the contents of which determine the operation of ICU 26.

Figure 3A:
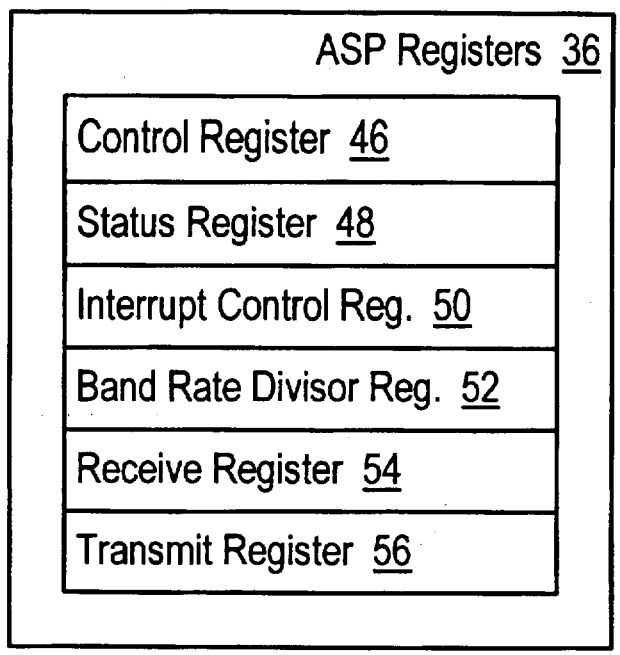
FIG. 3a is a block diagram of a preferred embodiment of ASP registers included within each ASP of FIG. 2.

FIG. 3a is a block diagram of a preferred embodiment of ASP registers 36 included within each ASP 12. ASP registers 36 include a control register 46, a status register 48, an interrupt control register 50, a baud rate divisor register 52, a receive register 54, and a transmit register 56. The contents of control register 46 control both the transmit and receive operations of the corresponding ASP 12. The contents of status register 48 provide information about the current status of the corresponding ASP 12. The contents of interrupt control register 50 determines whether the corresponding ASP 12 may generate an interrupt request signal and the priority of the interrupt request signal relative to other interrupt request signals. The contents of baud rate divisor register 52 determine the amount of time allotted to each bit of serial communication data during operation of the corresponding ASP 12. Receive register 54 contains serial communication data received by the corresponding ASP 12. Serial communication data to be transmitted by the corresponding ASP 12 is written into transmit register 56.

Figure 3B:
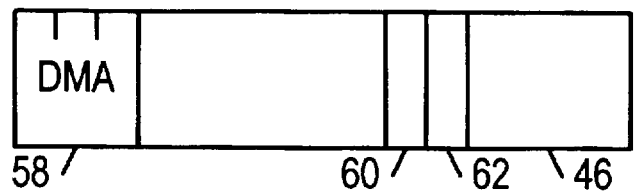
FIG. 3b is a block diagram of a preferred embodiment of a control register of the ASP registers of FIG. 3a, wherein the control register includes a DMA control field which configures the corresponding ASP for DMA transfers, a transmit mode enable bit which enables a transmit mode of the ASP, and a receive mode enable which enables a receive mode of the ASP.

FIG. 3b is a block diagram of a preferred embodiment of control register 46 of ASP registers 36. Control register 46 includes three contiguous bit positions forming a DMA control field 58, a transmit mode enable bit 60, and a receive mode enable bit 62. When transmit mode enable bit 60 is 1, the transmit mode is enabled, and the corresponding ASP 12 is configured to transmit serial communication data. When receive mode enable bit 62 is 1, the receive mode is enabled, and the corresponding ASP 12 is configured to receive serial communication data. The three bits of the DMA control field configure the corresponding ASP 12 for DMA transfers according to Table 1 below:

TABLE 1

DMA Control Field Definition.

| Contents | Receive Mode DMA Request Signal | Transmit Mode DMA Request Signal |
|---|---|---|
| 000 | (None) | (None) |
| 001 | DMA0 | DMA1 |
| 010 | DMA1 | DMA0 |
| 011 | (Reserved) | (Reserved) |
| 100 | DMA0 | (None) |
| 101 | DMA1 | (None) |
| 110 | (None) | DMA0 |
| 111 | (None) | DMA1 |

When the transmit mode of an ASP 12 is enabled and transmit data is to be transferred using DMA, the ASP 12 generates an internal DMA request signal following transmission of a unit of serial communication data (i.e., when transmit register 56 is empty). When the receive mode of an ASP 12 is enabled and receive data is to be transferred using DMA, the ASP 12 generates an internal DMA request signal when serial communication data is received (i.e., when receive register 54 is full). Each ASP 12 also produces DMA control signals which reflect the contents of DMA control field 58 of the corresponding control register 46. As described above, selection logic 40 of DMA unit 14 receives the internal DMA request signals and the DMA control signals. Selection logic 40 produces the two DMA request signals, DMA0 and DMA1, according to the internal DMA request signals and the DMA control signals.

For example, assume ASP 12a is configured to transmit serial communication data upon a first transmission medium, ASP 12b is configured to transmit serial communication data upon a second transmission medium, and data transfers between a transmit data buffer and a receive data buffer within an external memory unit are to be accomplished using DMA. Within control register 46 of ASP 12a, transmit mode enable bit 60 is 1, receive mode enable bit 62 is 0, and DMA control field 58 contains 110. When transmit register 56 within ASP 12a is empty, ASP 12a generates an internal DMA request signal. Based upon the DMA control signals generated by ASP 12a, select logic 40 generates DMA request signal DMA0 when the internal DMA request signal from ASP 12a is received. Thus a properly configured DMA channel 38a is used to transfer serial communication data from the transmit data buffer to ASP 12a for transmission. Within control register 46 of ASP 12b, transmit mode enable bit 60 is 0, receive mode enable bit 62 is 1, and DMA control field 58 contains 101. When receive register 54 within ASP 12b is fill, ASP 12b generates an internal DMA request signal. Based upon the DMA control signals generated by ASP 12b, Select logic 40 generates DMA request signal DMA1 when the internal DMA request signal from ASP 12b is received. Thus a properly configured DMA channel 38b is used to transfer serial communication data from ASP 12b to the receive data buffer.

When select logic 40 generates a DMA request signal DMA0 or DMA1, the corresponding external DMA request signal DRQ0 or DRQ1 is disabled. When not designated for use by ASPs 12a–b, DMA request signal DMA0 or DMA1 is produced by select logic 40 in response to a received corresponding external DMA request signal DRQ0 or DRQ1. For example, assume ASP 12a is configured to transmit serial communication data upon a first transmission medium, ASP 12b is not in use, and data transfers from a transmit data buffer within an external memory unit to ASP 12a are to be accomplished using DMA. Within control register 46 of ASP 12a, transmit mode enable bit 60 is 1, receive mode enable bit 62 is 0, and DMA control field 58 contains 110. When transmit register 56 within ASP 12a is empty, ASP 12a generates an internal DMA request signal. Based upon the DMA control signals generated by ASP 12a, select logic 40 generates DMA request signal DMA0 when the internal DMA request signal from ASP 12a is received. Thus a properly configured DMA channel 38a is used to transfer serial communication data from the transmit data buffer to ASP 12a for transmission. Within control register 46 of ASP 12b, transmit mode enable bit 60 is 0, receive mode enable bit 62 is 0, and DMA control field 58 contains 000. The DMA control signals produced by ASPs 12a–b designate the use of DMA request signal DMA0 but do not designate the use of DMA request signal DMA1. As a result, select logic 40 ignores external DMA request signal DRQ0 and produces DMA request signal DMA1 when external signal DRQ1 is asserted.

Figure 3C:
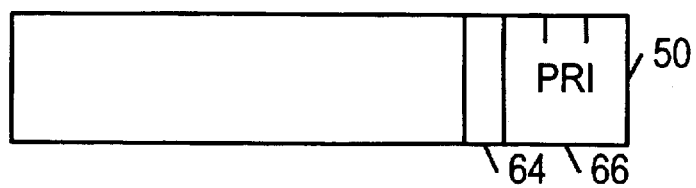
FIG. 3c is a block diagram of a preferred embodiment of an interrupt control register of the ASP registers of FIG. 3a, wherein the interrupt control register includes a interrupt mask bit which determines whether the corresponding ASP produces an ASP interrupt request signal, and an interrupt priority field which contains a number determining the priority of the ASP interrupt request signal relative to other interrupt request signals generated by other devices.

FIG. 3c is a block diagram of a preferred embodiment of interrupt control register 50 of ASP registers 36. Interrupt control register 50 includes an interrupt mask bit 64 and three contiguous bit locations defining an interrupt priority field 66. Interrupt mask bit 64 determines whether the corresponding ASP 12 produces an ASP interrupt request signal. When interrupt mask bit 64 is 0, the corresponding ASP 12 produces an ASP interrupt request signal upon the occurrence of certain internal conditions (e.g., parity error detected, framing error detected, overrun error detected, etc.). A parity error occurs for even parity when the number of received data bits having a value of 1 is odd and the parity bit is not set, and the occurs for odd parity when the number of received data bits having a value of 1 is even and the parity bit is not set. A framing error occurs when a stop bit is expected and the received value is a 0. An overrun error occurs when ASP 12 overwrites valid, unread data within receive register 54. When interrupt mask bit 64 is 1, the corresponding ASP 12 is prevented from producing an ASP interrupt request signal. The three bits of interrupt priority field 66 contain a number from 0 to 7 determining the priority of the ASP interrupt request signal relative to other interrupt request signals generated by other devices.

Figure 4A:
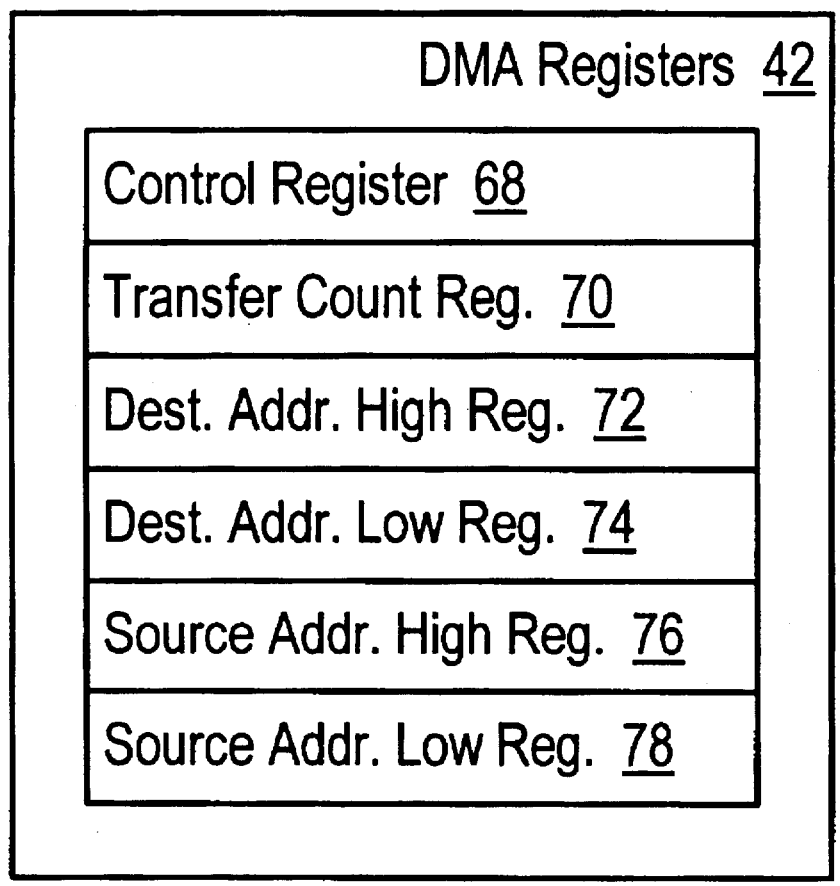
FIG. 4a is a block diagram of a preferred embodiment of DMA registers included within each DMA channel circuit of FIG. 2.

FIG. 4a is a block diagram of a preferred embodiment of DMA registers 42 included within each DMA channel 38. DMA registers 42 include a control register 68, a transfer count register 70, a destination address high register 72, a destination address low register 74, a source address high register 76, and a source address low 78. The contents of control register 46 determine the mode of operation of the corresponding DMA channel 38. During configuration of DMA channel 38, the number of data units (e.g., bytes) to be transferred is written into transfer count register 70. Transfer count register 70 is decremented after each data transfer, and DMA channel 38 activity terminates when the value stored within transfer count register 70 reaches 0. Prior to a DMA operation, destination address high register 72 is initialized to contain the highest-ordered bits of the address of the destination of the DMA transfer, and destination address low register 74 is initialized to contain the lowest-ordered bits of the address of the destination of the DMA transfer. Similarly, source address high register 76 is initialized to contain the highest-ordered bits of the address of the source of the DMA transfer, and source address low register 78 is initialized to contain the lowest-ordered bits of the address of the source of the DMA transfer. Following each data transfer, the destination and source addresses are either incremented or decremented.

Figure 4B:
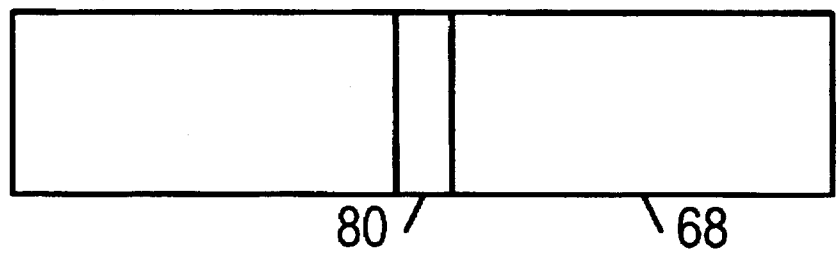
FIG. 4b is a block diagram of a preferred embodiment of a control register of the DMA registers of FIG. 4a, wherein the control register includes an interrupt enable bit which determines whether the corresponding DMA channel circuit generates a DMA interrupt request signal upon completion of a DMA data transfer operation.

FIG. 4b is a block diagram of a preferred embodiment of control register 68 of DMA registers 42. Control register 68 includes an interrupt enable bit 80 which determines whether the corresponding DMA channel 38 generates a DMA interrupt request signal upon completion of a DMA data transfer operation (i.e., when the value stored in transfer count register 70 reaches 0). When interrupt enable bit 80 is 0, the corresponding DMA channel 38 does not produce the DMA interrupt request signal upon completion of the DMA operation. When interrupt enable bit 80 is 1, the corresponding DMA channel 38 generates the DMA interrupt request signal when the value stored in transfer count register 70 reaches 0.

Figure 5A:
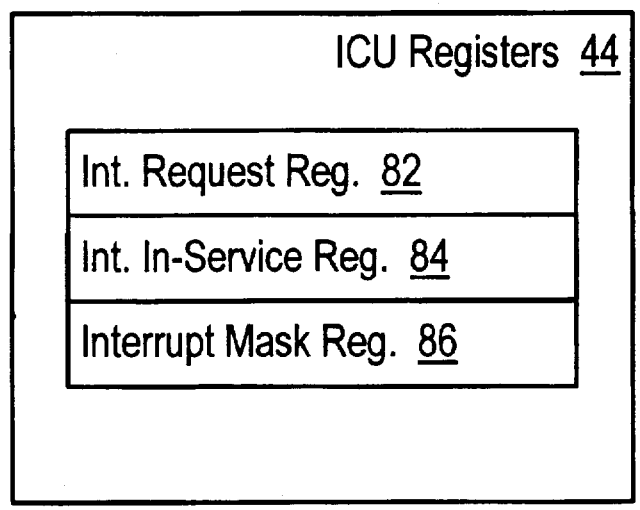
FIG. 5a is a block diagram of a preferred embodiment of ICU registers included within the ICU of FIG. 2.

FIG. 5a is a block diagram of a preferred embodiment of ICU registers 44 included within ICU 26. ICU registers 44 include an interrupt request register 82, an interrupt in-service register 84, and an interrupt mask register 86. Devices within or coupled to microprocessor 10 and capable of generating an interrupt request signal are assigned corresponding bit locations within interrupt request register 82, interrupt in-service register 84, and interrupt mask register 86. When a device generates an interrupt request signal, the corresponding bit within interrupt request register 82 is set to 1. When the interrupt request signal is responded to (i.e., taken), the corresponding bit within interrupt request register 82 is reset to 0 during an interrupt acknowledge operation, and the corresponding bit within the interrupt in-service register 84 is set to 1 by ICU 26. Programming the bit location corresponding to a given device within interrupt mask register 86 either enables or disables the interrupt request signal generated by the device.

Figure 5B:
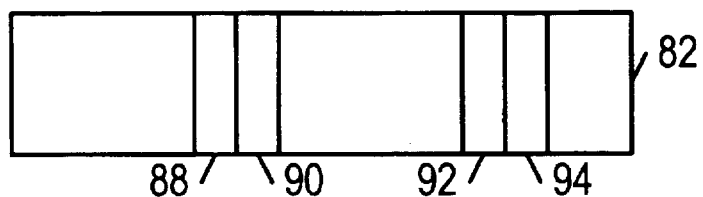
FIG. 5b is a block diagram of a preferred embodiment of an interrupt request register of the ICU registers of FIG. 5a, wherein the interrupt request register includes bit positions associated with each ASP and each DMA channel circuit, and wherein when an ASP or DMA channel generates an interrupt request signal, the corresponding bit position within the interrupt request register is set to 1.

FIG. 5b is a block diagram of a preferred embodiment of interrupt request register 82 of ICU registers 44. Interrupt request register 82 includes a bit 88 designated for ASP 12a, a bit 90 designated for ASP 12b, a bit 92 designated for DMA channel 38b, and a bit 94 designated for DMA channel 38a. Bit 88 is set to 1 when ASP 12a generates an ASP interrupt request signal. Bit 90 is set to 1 when ASP 12b produces an ASP interrupt request signal. When DMA channel 38b generates a DMA interrupt request signal, bit 92 within interrupt request register 82 is set to 1. Bit 94 is set to 1 when DMA channel 38a produces a DMA interrupt request signal. Interrupt request register 82 is a read-only register assigned an address within the address space of microprocessor 10. Reading the value stored within interrupt request register 82 yields the status of device interrupt request signals. Once set, individual bits within interrupt request register 82 are reset to 0 during an interrupt acknowledge operation.

Figure 5C:
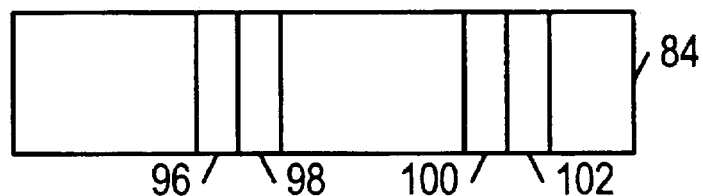
FIG. 5c is a block diagram of a preferred embodiment of an interrupt in-service register of the ICU registers of FIG. 5a, wherein the interrupt in-service register includes bit positions associated with each ASP and each DMA channel circuit, and wherein when an interrupt request signal generated by an ASP or DMA channel is responded to, the ICU sets the corresponding bit position within the interrupt request register to 1.

FIG. 5c is a block diagram of a preferred embodiment of interrupt in-service register 84 of ICU registers 44. Interrupt in-service register 84 includes a bit 96 designated for ASP 12a, a bit 98 designated for ASP 12b, a bit 100 designated for DMA channel 38b, and a bit 102 designated for DMA channel 38a. ICU 26 sets bit 96 to 1 when the ASP interrupt request signal generated by ASP 12a is taken. Bit 98 is set to 1 when the ASP interrupt request signal generated by ASP 12b is responded to. When the DMA interrupt request signal generated by DMA channel 38b is taken, ICU 26 sets bit 100 within interrupt in-service register 84 to 1. Bit 102 is set to 1 when the DMA interrupt request signal generated by DMA channel 38a is responded to. Once set, individual bits within interrupt in-service register 84 are reset to 0 following completion of the associated interrupt service routine.

Figure 5D:
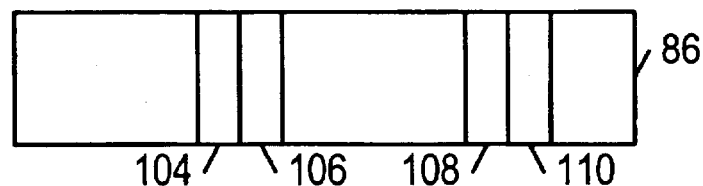
FIG. 5d is a block diagram of a preferred embodiment of an interrupt mask register of the ICU registers of FIG. 5a, wherein the interrupt mask register includes bit positions associated with each ASP and each DMA channel circuit, and wherein the value stored within a bit position of the interrupt mask register determines whether an interrupt request signal generated by the corresponding device is responded to or ignored.

FIG. 5d is a block diagram of a preferred embodiment of interrupt mask register 86 of ICU registers 44. Interrupt mask register 86 includes a bit 104 designated for ASP 12a, a bit 106 designated for ASP 12b, a bit 108 designated for DMA channel 38b, and a bit 110 designated for DMA channel 38a. Interrupt mask register 86 is assigned an address within the address space of microprocessor 10, and a value may be stored within interrupt mask register 86 by writing the value to the address assigned to interrupt mask register 86. When bit 104 is set to 0, the ASP interrupt request signal generated by ASP 12a is enabled. The ASP interrupt request signal generated by ASP 12b is enabled when bit 106 is set to 0. When bit 108 is set to 0, the DMA interrupt request signal generated by DMA channel 38b is enabled. The DMA interrupt request signal generated by DMA channel 38a is enabled when bit 110 is set to 0.

It will be appreciated by those skilled in the art having the benefit of this disclosure that this invention is believed to be a microcontroller which is configurable to transfer data to and from one or more asynchronous serial ports (ASPs) using direct memory access (DMA). Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A microcontroller formed upon a single monolithic semiconductor substrate, comprising:
   an asynchronous serial port (ASP) adapted to receive serial communication data and configurable to generate an internal direct memory access (DMA) request signal in response to the serial communication data;
   an input/output (I/O) pad adapted to receive an external DMA request signal; a DMA unit, comprising:
      selection logic coupled to receive the internal and external DMA request signals and configured to select between the internal and external DMA request signals in order to produce a DMA request signal; and
      DMA channel circuitry coupled to receive the DMA request signal and configurable to perform a data transfer operation in response to the DMA request signal; and
   wherein the ASP comprises at least one configuration register, and wherein generation of the internal DMA request signal by the ASP is determined by the contents of at least one bit position within the at least one configuration register.

2. The microcontroller as recited in claim 1, wherein the ASP is adapted to receive a serial bit stream comprising the serial communication data and is configurable to extract the serial communication data from the serial bit stream prior to generating the internal DMA request signal.

3. The microcontroller as recited in claim 1, wherein the external DMA request signal is generated by a device external to the microcontroller.

4. The microcontroller as recited in claim 1, wherein the data transfer operation comprises reading data from a first address and writing the data to a second address.

5. The microcontroller as recited in claim 1, wherein operation of the ASP is configured according to the contents of the at least one configuration register.

6. The microcontroller as recited in claim 6, wherein the ASP also produces a plurality of DMA control signals according to the contents of at least one bit position within the at least one configuration register.

7. The microcontroller as recited in claim 6, wherein the selection logic is coupled to receive the plurality of DMA control signals and produces the DMA request signal according to the plurality of DMA control signals.

8. The microcontroller as recited in claim 1, wherein the at least one bit position includes a transmit mode enable bit, and wherein when the transmit mode enable bit is set, the ASP generates the internal DMA request signal following transmission of a unit of serial communication data.

9. The microcontroller as recited in claim 1, wherein the at least one bit position includes a receive mode enable bit, and wherein when the receive mode enable bit is set, the ASP generates the internal DMA request signal when serial communication data is received.

10. A microcontroller formed upon a single monolithic semiconductor substrate, comprising:
    an asynchronous serial port (ASP) adapted to receive serial communication data, wherein the ASP is configurable to generate an internal direct memory access (DMA) request signal in response to the serial communication data, and to generate an ASP interrupt request signal when at least one predefined error condition occurs;

an I/O pad coupled to receive an external DMA request signal; and a DMA unit, comprising:

selection logic coupled to receive the internal and external DMA request signals and configured to select between the internal and external DMA request signals in order to produce a DMA request signal; and DMA channel circuitry coupled to receive the DMA request signal, wherein the DMA channel circuitry is configurable to perform a data transfer operation in response to the DMA request signal and to generate a DMA interrupt request signal when the data transfer operation is complete;

an interrupt control unit coupled to receive the ASP and DMA interrupt request signals and configured to produce an interrupt request signal in response to the ASP and DMA interrupt request signals;

an execution unit coupled to receive the interrupt request signal and configured to execute instructions, wherein the execution unit executes a predefined set of instructions in response to the interrupt request signal; and wherein the ASP comprises at least one configuration register, and wherein generation of the internal DMA request signal by the ASP is determined by the contents of at least one bit position within the at least one configuration register.

11. The microcontroller as recited in claim 10, wherein the ASP is adapted to receive a serial bit stream comprising the serial communication data and is configurable to extract the serial communication data from the serial bit stream prior to generating the internal DMA request signal.

12. The microcontroller as recited in claim 10, wherein the external DMA request signal is generated by a device external to the microcontroller.

13. The microcontroller as recited in claim 10, wherein the data transfer operation comprises reading data from a first address and writing the data to a second address.

14. The microcontroller as recited in claim 10, wherein operation of the ASP is configured according to the contents of the at least one configuration register.

15. The microcontroller as recited in claim 14, wherein the ASP also produces a plurality of DMA control signals according to the contents of at least one bit position within the at least one configuration register.

16. The microcontroller as recited in claim 15, wherein the selection logic is coupled to receive the plurality of DMA control signals and produces the DMA request signal according to the plurality of DMA control signals.

17. The microcontroller as recited in claim 14, wherein generation of the ASP interrupt request signal by the ASP is determined by the contents of at least one bit position within the at least one configuration register.

18. The microcontroller as recited in claim 10, wherein the ASP is configurable to generate the ASP interrupt request signal when at least one predefined error condition exists.

19. The microcontroller as recited in claim 10, wherein the DMA channel circuitry comprises at least one configuration register, and wherein operation of the DMA unit is configured according to the contents of the at least one configuration register, and wherein generation of the DMA interrupt request signal is determined by the contents of at least one bit position within the at least one configuration register.

20. The microcontroller as recited in claim 19, wherein the predefined error conditions include the occurrence of a parity error, a framing error, and an overrun error.

21. A communication system, comprising:

an input/output (I/O) device configured to produce an external direct memory access (DMA) request signal;

a communications device configured to produce serial communication data;

a microcontroller operably coupled to the I/O device and the communications device, comprising:

an asynchronous serial port (ASP) coupled to receive the serial communication data and configurable to generate an internal DMA request signal in response to the serial communication data;

an I/O pad coupled to receive the external DMA request signal; and a DMA unit, comprising:

selection logic coupled to receive the internal and external DMA request signals and configured to select between the internal and external DMA request signals in order to produce a DMA request signal;

DMA channel circuitry coupled to receive the DMA request signal and configurable to perform a data transfer operation in response to the DMA request signal; and wherein the ASP comprises at least one configuration register, and wherein generation of the internal DMA request signal by the ASP is determined by the contents of at least one bit position within the at least one configuration register.

* * * * *

UNITED STATES PATENT AND TRADEMARK OFFICE
CERTIFICATE OF CORRECTION

PATENT NO. : 5,896,549

DATED : April 20, 1999

INVENTOR(S) :
Hansen et al.

It is certified that error appears in the above-identified patent and that said Letters Patent is hereby corrected as shown below:

In the Claims:

Claim 6, col. 12, line 41, after the phrase "as recited in claim" please delete "6" and substitute therefor --1--.

Signed and Sealed this

Seventh Day of September, 1999

Attest:

Q. TODD DICKINSON

*Attesting Officer*   *Acting Commissioner of Patents and Trademarks*